United States Patent [19]

Perkins

[11] 4,280,578

[45] Jul. 28, 1981

[54] MOTORIZED WALKER FOR THE DISABLED

[75] Inventor: Jack E. Perkins, Salt Lake City, Utah

[73] Assignee: Margaret P. Roberts, Sandy, Utah ; a part interest

[21] Appl. No.: 13,782

[22] Filed: Feb. 21, 1979

[51] Int. Cl.³ .............................................. B62D 11/04

[52] U.S. Cl. .................................. 180/6.5; 180/19 H; 272/70

[58] Field of Search ................. 180/19 R, 19 S, 19 H, 180/6.5, 65, DIG. 3; 272/70, 70.3

[56] References Cited

U.S. PATENT DOCUMENTS

| | | | |
|---|---|---|---|
| 2,210,269 | 8/1940 | Taylor | 280/242 WC |
| 2,871,915 | 2/1959 | Hogan | 272/70 |
| 3,094,185 | 6/1963 | Racoosin | 180/19 R |
| 3,156,315 | 11/1964 | Hawgood | 180/19 R |
| 3,688,789 | 9/1972 | Bunch | 272/70 |
| 3,780,663 | 12/1973 | Pettit | 272/70 |
| 4,029,311 | 6/1977 | Chanslor | 272/70.3 |
| 4,037,676 | 7/1977 | Ruse | 180/DIG. 3 |

*Primary Examiner*—John P. Silverstrim
*Attorney, Agent, or Firm*—Mallinckrodt & Mallinckrodt

[57] ABSTRACT

A walker device for aiding invalids and other persons having walking difficulties has an upstanding open-bottomed framework toward and within which a person can take steps while holding on and being supported by the framework. The framework is provided with wheels and is motorized, with controls conveniently located for activation by the person using the device.

6 Claims, 6 Drawing Figures

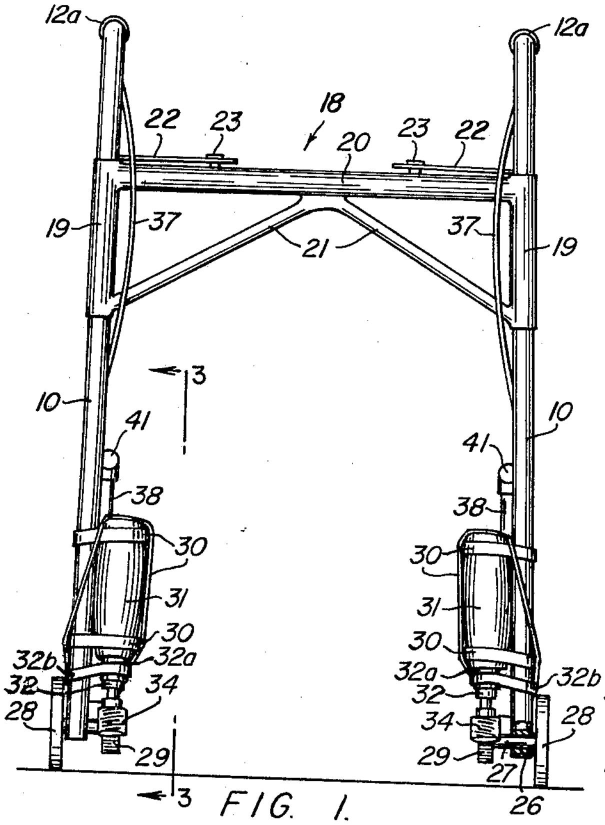
FIG. 1.
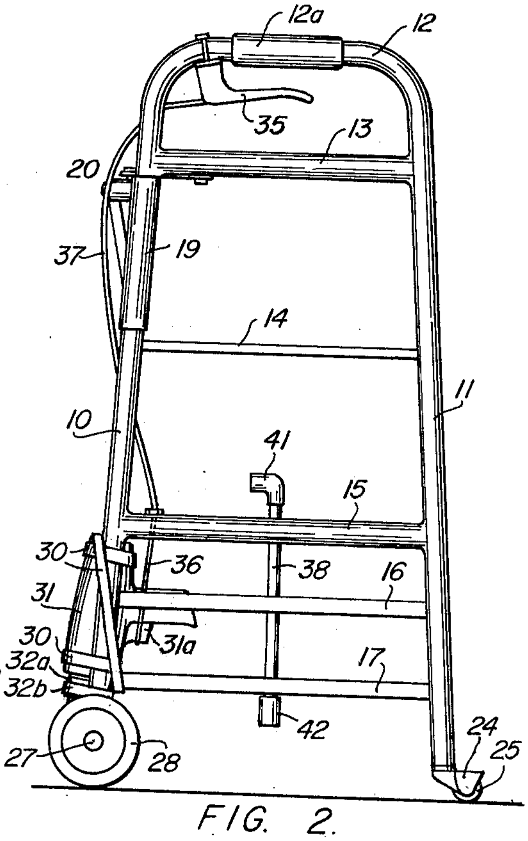
FIG. 2.
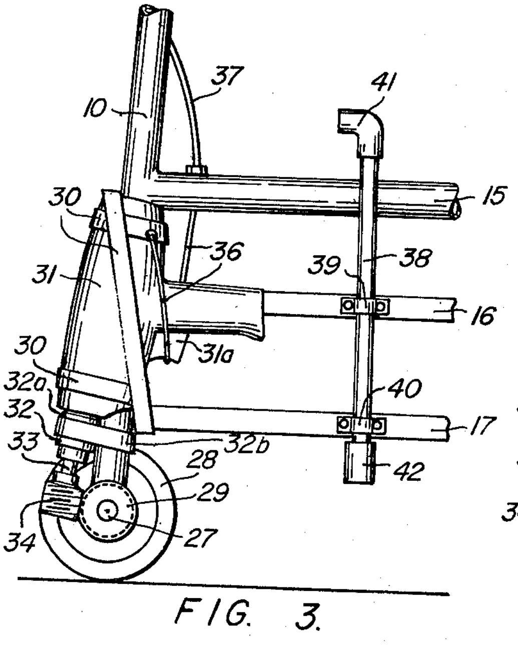
FIG. 3.
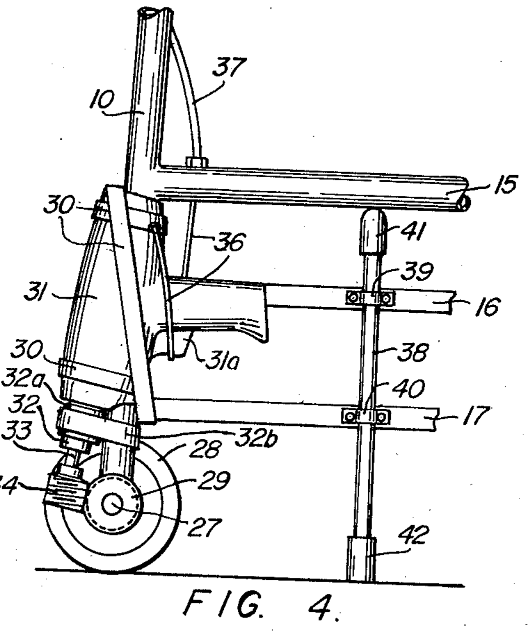
FIG. 4.
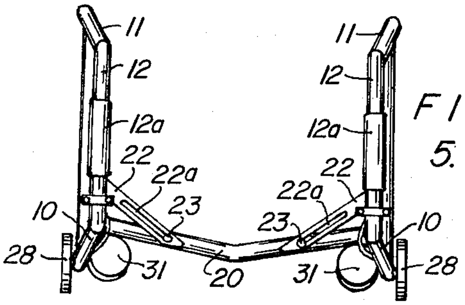
FIG. 5.
FIG. 6.
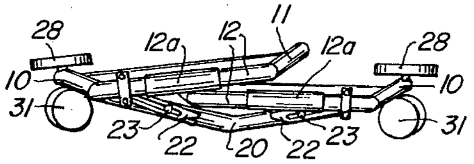

MOTORIZED WALKER FOR THE DISABLED

BACKGROUND OF THE INVENTION

Field

The invention is in the field of devices for aiding walking by disabled persons having walking difficulties, and is specifically directed to those well-known devices commonly called "walkers".

State of the Art

There are currently available for use by persons having walking difficulties devices generally spoken of as "walkers". These devices are normally constructed as four-legged, open-bottomed, self-standing structures that a person can approach and stand within for at least partial support while holding on during the taking of walking steps. Examples of typical walker devices of this kind are shown in U.S. Pat. Nos. 2,708,473 and 3,354,893. The persons using the device picks it up, places it on the ground a distance of several steps in front of him, and then walks to it while holding on for support, whereupon the process is repeated.

While this procedure is satisfactory for some people, it requires a person to bend or lean forward to place the walker device in front of him and then to walk to the device while holding on to it in such bent position. This is very difficult or impossible for many people with walking problems and does not provide a normal walking position wherein a person strenghens the muscles necessary to walk normally without the walker. Thus, the conventional walker cannot be used by some, and, for many by whom it can be used, it is merely an aid to getting around but does not provide therapy to rehabilitate the person. Further, some people using conventional walkers are very weak and find it difficult to walk any distance, even with the help provided by the walker.

A so-called "motorized walker" is disclosed in U.S. Pat. No. 3,872,945. The title of the patent is misleading however, because the device disclosed is actually a motorized vehicle, similar to a motorized wheelchair, in which the user is merely carried around by the device in a standing rather than a sitting position. The user does not walk and cannot walk with the device. Such a device does not provide any therapy for the user.

SUMMARY OF THE INVENTION

According to the invention, a motorized walker that allows a person with walking difficulties to stand and walk in a normal, upright position while using the walker, comprises an open-bottomed framework that preferably includes two mutually spaced pairs of front and rear supporting legs structurally joined as a frame which has handles. The frames are joined in mutually spaced relationship to form a self-standing, four-sided, four legged, open-bottomed structure having three closed sides and an open side, so that a person using the walker has a leg frame and a handle on either side of him. A castor wheel is secured to one leg of each pair of legs, preferably the rear leg of each pair, and a powered drive wheel is secured to the other leg of each pair. Independent motors are respectively coupled to the drive wheels, and are preferably independently controlled by the user. Operation of both motors simultaneously moves the walker straight ahead. Operation of one or the other motor alone moves the walker to the right or to the left.

It is preferred that the framework be made foldable to provide a compact package for ease of transportation and storage. It is also preferred that the walker be provided with an auxiliary pair of legs for use when climbing or descending stairs.

THE DRAWINGS

The best mode presently contemplated for carrying out the invention is shown in the accompanying drawings, in which:

FIG. 1 is a view in front elevation of a foldable, motorized walker in accordance with the invention and including an auxiliary pair of legs to facilitate climbing or descending stairs;

FIG. 2, a view in side elevation;

FIG. 3, a fragmentary view taken on the line 3—3 of FIG. 1 and drawn to a larger scale;

FIG. 4, a view corresponding to that of FIG. 3, but showing the auxiliary leg locked in lowered position;

FIG. 5, a top plan view of the walker of the foregoing Figs. drawn to a smaller scale; and FIG. 6, a similar view after the walker has been folded into compact carrying and storing position.

DETAILED DESCRIPTION OF THE ILLUSTRATED EMBODIMENT

In the form illustrated, the walker is constructed of metal tubing appropriately cut and bent. Pairs of front and rear legs 10 and 11, respectively, and handle members 12 are provided by bending respective lengths of metal tubing into substantially U-formation to form respective frames having crossbars 13, 14, 15, 16, and 17, respectively. The frame are mutually spaced apart and foldably joined together at the front by means of a yoke 18 comprising sleeve members 19, which are snugly received by the respective front legs 10 of such frames for pivotal movement thereon. Yoke 18 also comprises crossbar 20 and diagonal reinforcing struts 21.

As so constructed, an open-bottomed, four-legged, structural framework is provided, open at its rear in the unfolded condition of FIGS. 1–5 for entry and exit of the user. Hand grips **12*a* are desirably provided on handle members 12** for grasping by the hands of the user as he stands and walks into and within the framework during forward movement thereof.

The respective frames may be folded inwardly against yoke 18, as indicated in FIG. 6, to form a relatively compact package for storing or transporting. Locking members 22, FIGS. 5 and 6, are pivotally attached to the undersides of frame crossbars 13, respectively, and are provided with slots **22*a* which slidably receive respective posts 23 rigidly upstanding from crossbar 20 of yoke 18. Such locking members 22 snap into engagement with posts 23 when the frames are unfolded and placed in normal operative position as shown in FIG. 5**.

The aforedescribed structure, with rubber pads on the lower ends of the legs, constitutes a walker as conventionally used and as commercially available from medical equipment houses and rental outlets. Although it is convenient to use such a commercially available walker to provide the structural framework for the walker of the invention, it would be preferred in any large scale manufacturing of the invention to construct the walker framework with tubular legs 10 that are square in cross section to facilitate the mounting of motors thereon. There is also no reason to have the legs at an angle to the vertical as are the legs provided by the U-frames herein. Vertical legs would be satisfactory.

In the present embodiment of the invention, swivel mounts 24, FIG. 2, with caster wheels 25 are attached to the bottoms of rear legs 11, respectively, and bushings 26 with shafts 27 passing therethrough and journaled therein are attached to the bottoms of front legs 10, respectively. Fixedly secured to corresponding ends of shafts 27 are respective drive wheels 28, and fixedly secured to the other ends of such shafts 27 are respective worm wheels 29. Attached to the lower portions of legs 10, as by metal straps 30, are electrical motor and battery pack units 31.

Such units 31 are conveniently of cordless type as normally embodied in electric drills, such as those manufactured by Skil Corporation and identified as Model 2006. They have self-contained, rechargeable, battery packs (not shown as such), and are operated by pressing respective triggers 31*a*. It is convenient to use the drill units as such and to connect the usual chucks 32 thereof with the respective drive wheels 28 by means of speed-reduction gearing. Thus, as shown, stub shafts 33 extending from fixed connection with respective worms 34 are secured within the chucks of the respective drill units so that the worms are in meshing engagement with the respective worm wheels. When the motor is energized, worms 34 turn worm wheels 29, shafts 27, and drive wheels 28.

To further secure each motor unit 31 in position so that the worm 34 thereof remains in mesh with its worm wheel 29, a roller bearing 32*a* is fitted on chuck 32 and a metal strap 32*b* is wrapped about the outer race of the bearing and is anchored to the corresponding leg 10. Interposing shims (not shown) between motor unit 31 and leg 10 may be necessary for proper alignment of worm 34 and worm wheel 29. It should be noted that, with the motor and gear arrangement shown, in order for both drive wheels to rotate in the same direction, the worm and worm wheel associated with one drill unit must be of opposite hand from the worm and worm wheel of the other drill unit if the motors operate in the same direction, or, if the worms and worm wheels are of the same hand, the motors units must operate in opposite directions. The drill units described are reversible so may be set to operate in opposite directions.

In order to conveniently control motors 31 while using the walker and holding on to handle members 12, control levers 35 are attached to such handle members so as to be easily operable by the person holding on. Control cables 36, protected by and movable within cable sheaths 37, are connected at corresponding ends to respective levers 35 and are anchored at their other ends, as by connection to the respective motors 31, or as shown, to appropriate straps 30, after being looped tautly under triggers 31*a* of such motors, FIGS. 3 and 4. Thus, when a lever 35 is pulled toward its handle member 12 so that its control cable 36 is pulled, trigger 31*a* of its motor 31 is pulled and the motor is energized.

Various other types of switches and actuating controls therefor could be used in connection with appropriate motors and in operable adjacency to handle members 12, as can be easily appreciated. For example, push-button electric switches could be positioned adjacent handle members 12 and wired in parallel with the trigger switches of the motors so that closing the push-button switches would operate the motors. Motors of either constant or variable speed may be used.

It is usually desired to have the walker travel at a speed between fifty and eighty feet per minute, although a slower speed may be necessary in some instances. The gearing required, i.e. gear ratio between worm and worm wheel, depends upon the diameter of the drive wheels 28, motor output speed, and desired walker speed. With motors as described and with drive wheels having a diameter of four inches, the gearing must reduce the motor output speed to about sixty RPMs to give a speed of just over sixty feet per minute.

In use, a person stands in normal, upright, walking position, with a leg frame and a handle member 12 on either side of him and with yoke 18 in front of him. He can easily stand in this position after entering the open rear side of the walker. Handle members 12 can be easily held in this position and control levers 35 can be easily operated. With both of the motors 31 operating, the walker moves forward and the person operating it walks along with it. If one of the motors is operated without the other, the walker pivots about the wheel that is not rotating. It should be noted that the person using the walker walks along as the walker moves and at the same speed. He can maintain an upright walking position at all times. This not only makes it easier for the person to get around from place to place, but provides rehabilitating exercise.

The motors and their connections with the drive wheels 28 are preferably such that the drive wheels cannot rotate freely, but only when their motors are operating. Accordingly, the drive wheels are effectively braked and the walker remains stationary when the motors are not in operation. The walker moves only in response to motor operation as controlled by the user.

The walker framework may be entirely rigid, but is preferably foldable and collapsible as shown in FIG. 6. Although it may be made collapsible in a number of different ways, the manner illustrated is preferred because when folded the total thickness of the collapsed structure is approximately only five inches. Thus, it can easily be slipped between the front and rear seat in an automobile or may easily be stored in a small closet.

The length of legs 10 and 11 will vary with the height of the person using the walker. Walkers of various predetermined heights may be made, or the legs 10 and 11 may be made height adjustable in any well-known manner.

With the construction and motors as shown and described, the weight added to that of a conventional, non-powered walker is just under ten pounds. If the batteries forming a part of the motors units 31 run down, the walker may still be used in conventional manner to reach a source of electricity for recharging the batteries. The rechargeable battery pack of a motor unit 31 has a charging time of about one hour. Thus, the batteries may be easily recharged most any place that they become discharged. For example, if the user is shopping, most stores have plug-in power outlets, and a user of the walker need only spend an hour for recharging to be completed so he can move on. A partial charge may be obtained in as little as five minutes, which will enable a user to travel a short distance, as for example to a car in a parking lot. The unit may then be further charged from a charger unit connected to the car's electrical system, as through the cigarette lighter, as the user is driving.

If desired, a larger storage battery capable of providing power for both motors over a longer period of time could be utilized, and this could be supported by a platform or a suitable receptacle appropriately provided by the framework.

In some instances, the user may get tired before completing his planned walk. For such situations, a seat (not shown) may be provided for placement between and support by crossbars 14. The seat is preferably provided as a separate part of the walker, and provision may be made to secure it to the walker in a position where it is out of the way yet available when desired.

It is preferred to provide the walker with stair-climbing ability. For this purpose, additional legs 38 are slidably mounted on crossbars 16 and 17 by means of brackets 39 and 40. The top of each leg 38 has an angle piece 41 attached thereto, so that when the leg is lowered to place its lower end in line with the bottoms of drive wheels 28 and caster wheels 25, it may be rotated to place angle piece 41 under the corresponding crossbar 15 and so lock the leg in its lowered position of FIG. 4. A rubber foot 42 is desirably provided on the bottom of the leg.

In normal use, auxiliary legs 38 are in raised position, as shown in FIGS. 2 and 3. When it is desired to climb or descend stairs, these legs are lowered and locked into place, see FIG. 4. For climbing purposes, the horizontal distance between legs 38 and drive wheels 28 should be less than the width of a normal stair tread, so the walker can be placed with the drive wheels 28 and the legs 38 resting on the same stair tread. For descending, the horizontal distance between legs 38 and caster wheels 25 should likewise be less than the width of a normal stair tread. When climbing or descending stairs, the walker is lifted and placed on either the next higher stair tread (for climbing) or the next lower stair tread (for descending) and the user then climbs or descends the one step, as the case may be. This process is repeated step by step.

In most cases, legs 10 and 11 of the pairs of same are spaced less than twenty inches apart at the base of the framework, so that, by locating legs 38 halfway between, they are less than ten inches from either drive wheel 28 or caster wheel 25. Such spacing is less than the width of the normal stair tread and enables the walker to be used on most stairways. However, if the distance between legs 10 and 11 of a pair is such that the auxiliary leg 38 cannot be positioned centrally and still be within normal stair tread distance from both drive and caster wheels of that pair, the legs 38 may be adjustably positioned or a set of similar legs may be provided, one set being spaced appropriately from the drive wheels and the other from the caster wheels.

It should be understood that a four-sided framework having handle-providing frames at opposite lateral sides of an open bottom and interconnected by a yoke at the front and open at the rear for entry and exit, such as specifically illustrated and described herein, is preferred but that other arrangements can be used such as a three-sided framework wherein handle-provided frames at opposite lateral sides of the open bottom converge forwardly from the open rear to a vertex requiring only one supporting leg and one drive wheel with a single drive motor, steering being accomplished by the user applying appropriate force differentially to the two handles and the motor control being provided on only one of such handles, or a caster wheel may be provided on the single front leg and drive wheels with respective motors on the rear legs. Also, if support for a large battery is desired, this may be provided within the four-sided framework of the preferred embodiment specifically described herein and handle members provided projecting rearwardly from such framework so the user walks between the handles rather than within the framework itself.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A walker device for the disabled, comprising a pair of sideframes, each of said side frames including front and rear supporting legs, a caster wheel secured to one of said legs, a fixed wheel secured to the other of said legs, means interconnecting said front and rear legs, and handle members mounted on said leg-interconnecting means; means interconnecting said side frames in spaced parallel relationship, whereby a disabled person may walk in the space between said sideframes while being supported by holding said handle members; electrically powered means including independent electric motors for driving said fixed wheels, respectively, to provide powered forward mobility for the device; and independent motor control means associated with the respective handle members for actuation by the respective hands of the disabled person, said power means being adapted to drive the walker device at a speed of substantially only from about 50 to about 80 feet per minute.

2. A walker according to claim 1, wherein the motor control means comprises levers secured to respective handle members, and activating cables extending from the respective levers to the respective motors.

3. A walker according to claim 1, wherein the powered means includes speed-reduction gearing between the motors and the fixed wheels driven thereby having a gear ratio such that the walker is driven at said speed.

4. A walker device for the disabled comprising a pair of side frames, each of said sideframes including front and rear supporting legs, a caster wheel secured to one of said legs, a fixed wheel secured to the other of said legs, means interconnecting said front and rear legs, and handle members mounted on said leg-interconnecting means; means interconnecting said side frames in spaced parallel relationship, whereby a disabled person may walk in the space between said sideframes while being supported by holding said handle members; an electric drill unit drivingly connected to each of said fixed wheels, wherein each drill unit is controlled by a trigger mechanism; and means for controlling each of said drill units independently, said controlling means including a lever movably secured on each said handle member, and a cable activated by each side lever, said cable being looped around said drill unit for pressing said trigger mechanism in response to movement of said lever.

5. A walker according to claim 4, wherein the electric drill units include respective chucks and are connected to the respective fixed drive wheels by respective speed-reduction drive gearing, each drive gearing comprising a shaft journaled in the particular leg concerned and having the drive wheel of that leg fixed on one end thereof, a worm wheel fixed on the other end of the shaft, and a worm in engagement with the worm wheel, said worm having a stub shaft extending in fixed relationship therewith and secured in the chuck of the particular drill unit concerned.

6. A walker according to claim 5, wherein the gear ratio is such that the walker is driven at a speed of from about 50 to about 80 feet per minute.

* * * * *